US012587117B2

(12) United States Patent
Chang

(10) Patent No.: US 12,587,117 B2
(45) Date of Patent: Mar. 24, 2026

(54) CONTROL DEVICE AND METHOD FOR ADJUSTING SPEED AND FORWARD/REVERSE ROTATION OF A WIRE-CONTROLLED BRUSHLESS MOTOR POWER SUPPLY DURING POSITIVE/NEGATIVE HALF-CYCLE PHASE LOSS

(71) Applicant: Rhine Electronic Co., Ltd., Taichung City (TW)

(72) Inventor: Yi-Kai Chang, Taichung City (TW)

(73) Assignee: Rhine Electronic Co., Ltd., Taichung City (TW)

( * ) Notice: Subject to any disclaimer, the term of this patent is extended or adjusted under 35 U.S.C. 154(b) by 120 days.

(21) Appl. No.: 18/451,544

(22) Filed: Aug. 17, 2023

(65) Prior Publication Data

US 2025/0047224 A1    Feb. 6, 2025

(30) Foreign Application Priority Data

Aug. 4, 2023    (TW) ................................. 112129454

(51) Int. Cl.
| | |
|---|---|
| *H02P 7/293* | (2016.01) |
| *F04D 25/06* | (2006.01) |
| *F04D 27/00* | (2006.01) |
| *H02P 7/03* | (2016.01) |
| *H02P 7/295* | (2016.01) |

(52) U.S. Cl.
CPC .............. *H02P 7/293* (2016.02); *F04D 25/06* (2013.01); *F04D 27/007* (2013.01); *H02P 7/05* (2016.02); *H02P 7/295* (2013.01)

(58) Field of Classification Search
CPC .. H02P 7/293; H02P 7/05; H02P 7/295; F04D 25/06; F04D 27/007
See application file for complete search history.

(56) References Cited

FOREIGN PATENT DOCUMENTS

| | | | | | |
|---|---|---|---|---|---|
| CN | 103260318 A | * | 8/2013 | ......... | H05B 33/0818 |
| CN | 107612340 A | * | 1/2018 | | |
| CN | 111600502 B | * | 10/2021 | ........ | H02M 7/53871 |
| CN | 115757048 A | * | 3/2023 | | |

* cited by examiner

*Primary Examiner* — Kawing Chan
(74) *Attorney, Agent, or Firm* — Muncy, Geissler, Olds & Lowe, P.C.

(57) ABSTRACT

The present invention relates to a control device and method for adjusting speed and forward/reverse rotation of a wire-controlled brushless motor power supply during positive/negative half-cycle phase loss, comprising an AC power supply, a wire-controlled circuit control device, a brushless motor control device, and a ceiling fan brushless motor, wherein the AC power supply is electrically connected to the wire-controlled circuit control device which is electrically connected to the brushless motor control device and which is electrically connected to the ceiling fan brushless motor, to control the AC power supply positive/negative half-cycle on/off and to generate a positive/negative half-cycle signal for multi-step speed and forward/reverse rotation control, detection, determination, and storage. The overall design is simple and convenient without the need for complicated and cumbersome wiring or safety concerns, to achieve the effect of structural stability and the use of safety and convenience.

6 Claims, 8 Drawing Sheets

AC IN

AC IN

AC IN

AC IN

AC IN

AC IN

CONTROL DEVICE AND METHOD FOR ADJUSTING SPEED AND FORWARD/REVERSE ROTATION OF A WIRE-CONTROLLED BRUSHLESS MOTOR POWER SUPPLY DURING POSITIVE/NEGATIVE HALF-CYCLE PHASE LOSS

FIELD OF INVENTION

The present invention is a control device and method for adjusting speed and forward/reverse rotation of a wire-controlled brushless motor power supply during positive/ negative half-cycle phase loss, more particularly concerning the application in the technical field of a ceiling fan brushless motor wire-controlled device.

BACKGROUND OF THE INVENTION

As shown in FIG. 8, the presently known structure for wired-controlled ceiling fans comprises an AC power supply 100, a brushless motor control device 20, a ceiling fan brushless motor 30, and a wall switch 40. Wherein the AC power supply 100 is electrically connected to the wall switch 40, which is further connected to the brushless motor control device 20. Meanwhile, the brushless motor control device 20 is electrically connected to the ceiling fan brushless motor 30, through which the wall switch 40 inputs and transmits a control signal to the brushless motor control device 20 to regulate the ceiling fan brushless motor 30. However, this arrangement cannot switch between different speeds and also cannot control directional airflow, including both upward and downward airflow achieved by forward and reverse rotation. To achieve the aforementioned control functions, the existing structure requires complicated wiring, resulting in a relatively complex and inconvenient installation and structure. Therefore, there is a need for improvement in this respect.

SUMMARY OF THE INVENTION

Given the problems of structural stability and poor convenience in the use of the conventional wire-controlled ceiling fan structure, the present invention has completed a control device and method for adjusting speed and forward/ reverse rotation of a wire-controlled brushless motor power supply during positive/negative half-cycle phase loss.

The main purpose of the present invention is to provide the control device and method for adjusting speed and forward/reverse rotation of a wire-controlled brushless motor power supply during positive/negative half-cycle phase loss, which is applied to an AC power supply and a ceiling fan brushless motor, comprising: a wire-controlled circuit control device and a brushless motor control device, the wire-controlled circuit control device being provided with a wire-controlled microcontroller unit, a positive/negative half-cycle control unit, a wire-controlled power unit, and at least one control key unit, wherein the wire-controlled microcontroller unit being electrically connected to the positive/negative half-cycle control unit, the wire-controlled power unit, and the control key unit, respectively, and wherein the brushless motor control device being provided with a brushless motor microcontroller unit, a positive half-cycle detector, a negative half-cycle detector, a brushless motor power unit, and a brushless motor control unit, the brushless motor microcontroller unit being electrically connected to the positive half-cycle detector, the negative half-cycle detector, and the brushless motor control unit, respectively, and the brushless motor power unit being electrically connected to the positive half-cycle detector, the negative half-cycle detector, and the brushless motor microcontroller unit, respectively. Wherein the AC power supply is electrically connected to the positive/negative half-cycle control unit of the wire-controlled circuit control device, the positive/negative half-cycle control unit of the wire-controlled circuit control device is electrically connected to the positive half-cycle detector, the negative half-cycle detector, and the brushless motor power unit of the brushless motor control device, and the brushless motor power unit is electrically connected to the brushless motor microcontroller unit and the brushless motor control unit, which is electrically connected to the ceiling fan brushless motor. By using the wire-controlled circuit control device to perform input of the positive/negative half-cycle control conditions, the brushless motor control device detects, interprets, and stores the step speed signals and the forward/reverse rotation signals and transmits the signals to the ceiling fan brushless motor for control.

In a preferred embodiment, the wire-controlled microcontroller unit of the wire-controlled circuit control device is an MCU (Microcontroller Unit), and the wire-controlled microcontroller unit is a microcomputer integrated with a central processor, a memory, etc., which enables the storage of the positive/negative half-cycle signals for controlling the on/off after the current/voltage in the AC power supply inputs to the wire-controlled circuit control device, thereby effectively simplifying the complexity of the wiring and increasing the multi-applicability of the present invention.

In a preferred embodiment, the positive/negative half-cycle control unit of the wire-controlled circuit control device is provided with a positive half-cycle switch control element and a negative half-cycle switch control element, and both of them are cooperated with a relay and a diode and are electrically connected to the AC power supply, which enables the control of the on/off input signals from the current/voltage without the need for control by complicated wiring, to increase the multi-applicability of the present invention.

In a preferred embodiment, the positive/negative half-cycle control unit of the wire-controlled circuit control device is provided with a switch control unit which is a bidirectional thyristor (TRIAC) and is electrically connected to the AC power supply, which enables the control of the on/off input signals from the current/voltage without the need for control by complicated wiring, to increase the multi-applicability of the present invention.

In a preferred embodiment, the brushless motor microcontroller unit of the brushless motor control device is a microcontroller unit (MCU), which is a microcomputer integrated with a central processor, a memory, a timer/ counter, etc., to receive positive/negative half-cycle phase loss signals from the wire-controlled circuit control device and to cooperate with the timing or interval signals generated by the timer/counter to perform an interpretation and to form the multi-step speed control signals or forward/reverse rotation control signals for storage, which are used to control the switching of the step speed and the forward/reverse rotation of the ceiling fan brushless motor by the control signals, thereby effectively simplifying the complexity of the wiring and increasing the multi-applicability of the present invention.

By cooperating with the AC power supply, the wire-controlled circuit control device, the brushless motor control device, and the ceiling fan brushless motor, wherein the AC power supply is electrically connected to the wire-controlled circuit control device, and the AC power supply inputs current/voltage in the power source to the wire-controlled circuit control device to control the on/off of the positive/negative half-cycle of the AC power supply with the wire-controlled circuit control device, and the wire-controlled circuit control device is electrically connected to the brushless motor control device; the positive/negative half-cycle phase loss signals derived from the wire control circuit control device is detected and controlled by the brushless motor control device and interpreted in accordance with the length of the positive half-cycle loss time only or the frequency of the positive half-cycle loss time only, and the length of the negative half-cycle loss time only or the frequency of the negative half-cycle loss time only, to generate the control information of the multi-step speed or forward/reverse rotation setting for the memory storage; and the brushless motor control device is electrically connected to the ceiling fan brushless motor, the brushless motor control device generates the control signals and transmits it to the ceiling fan brushless motor to perform the multi-step speed and forward/reverse rotation control. The overall arrangement is simple and convenient, without complicated wiring, which achieves the effect of structural stability and convenience in use.

BRIEF DESCRIPTION OF THE DRAWINGS

FIG. 7 is a reference diagram of the state for the second embodiment of a switching control unit of the positive/ negative half-cycle control unit having a bidirectional thyristor (TRIAC) provided in a circuit setting device of the wire-controlled circuit control device of the control device for adjusting speed and forward/reverse rotation of a wire-controlled brushless motor power supply during positive/negative half-cycle phase loss of the present invention.

DETAILED DESCRIPTION OF THE PREFERRED EMBODIMENTS

For a better understanding of the structure, features, and other purposes of the present invention, the following preferred embodiments are illustrated in detail in the accompanying drawings, provided that the embodiments illustrated herein are for illustrative purposes only and are not intended to serve as the sole limitation of the patent application.

Figure 1:
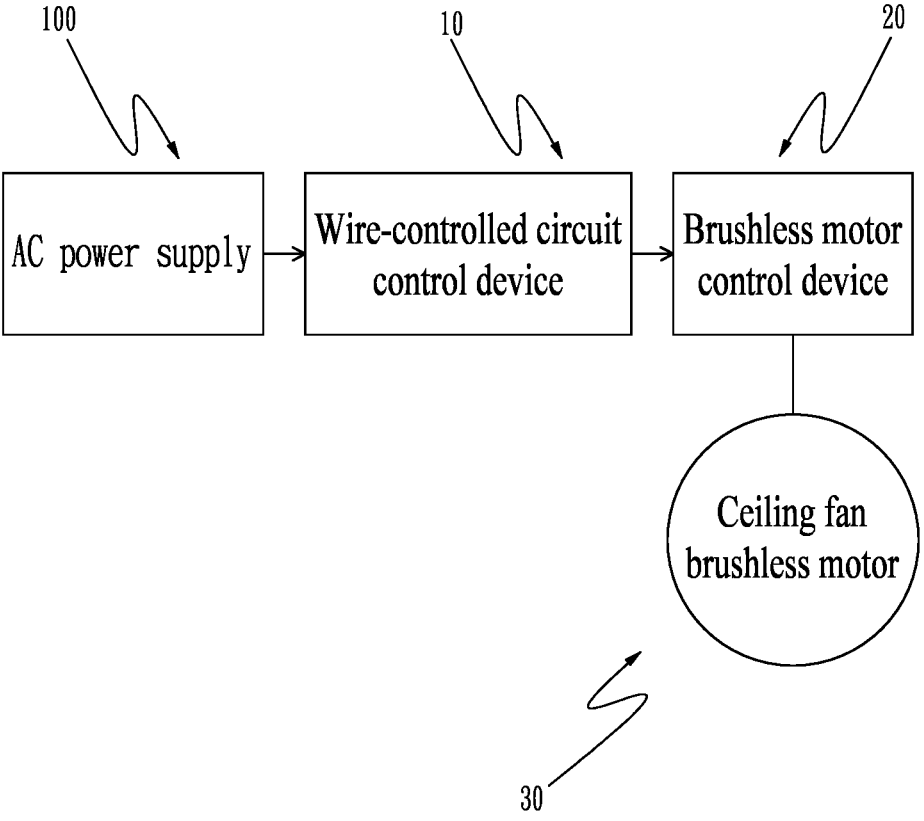
FIG. 1 is a reference diagram of the state of the overall composition of a control device for adjusting speed and forward/reverse rotation of a wire-controlled brushless motor power supply during positive/negative half-cycle phase loss of the present invention.
Figure 2:
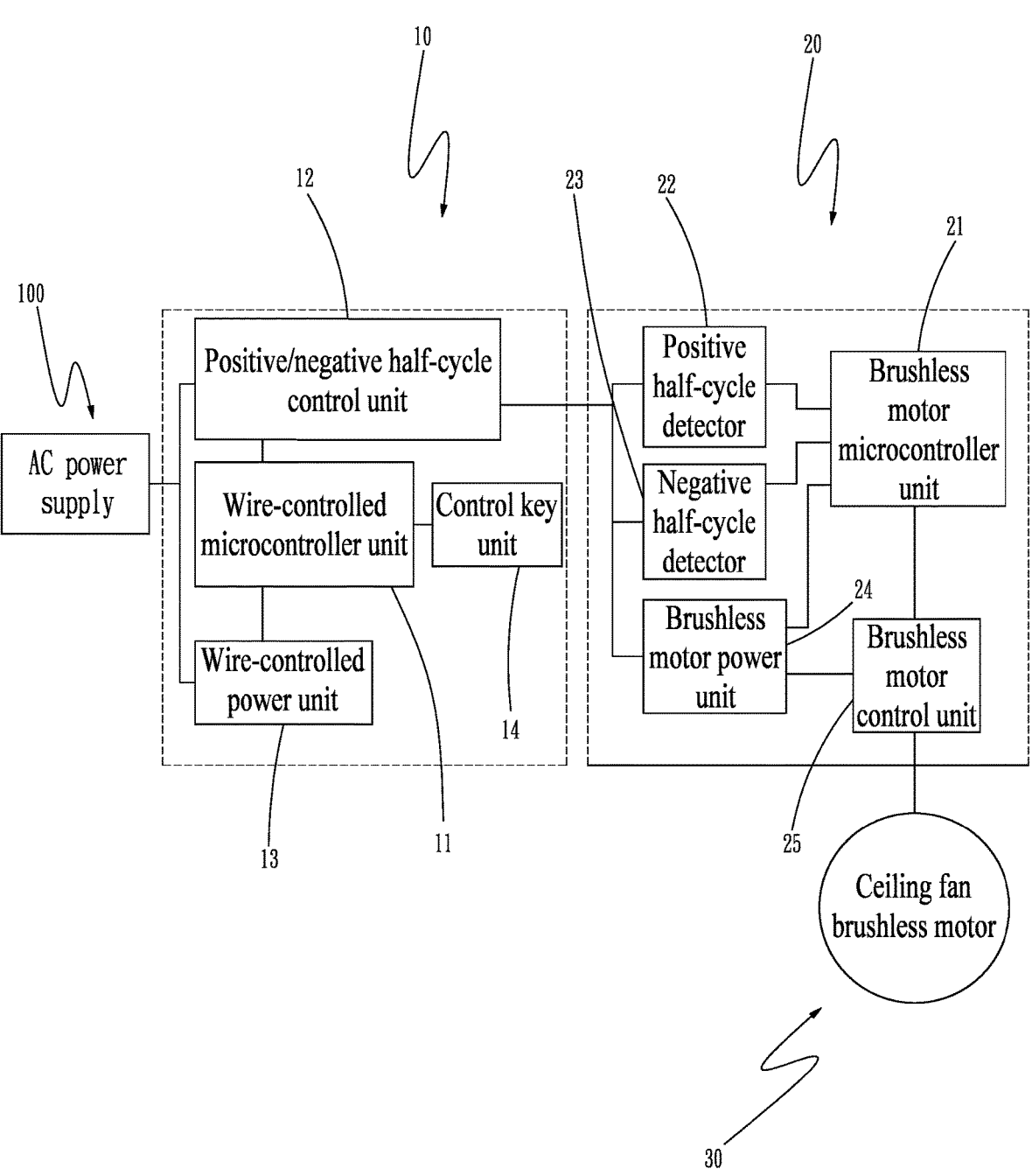
FIG. 2 is a reference diagram of the state of the detailed composition of the control device for adjusting speed and forward/reverse rotation of a wire-controlled brushless motor power supply during positive/negative half-cycle phase loss of the present invention.
Figure 3:
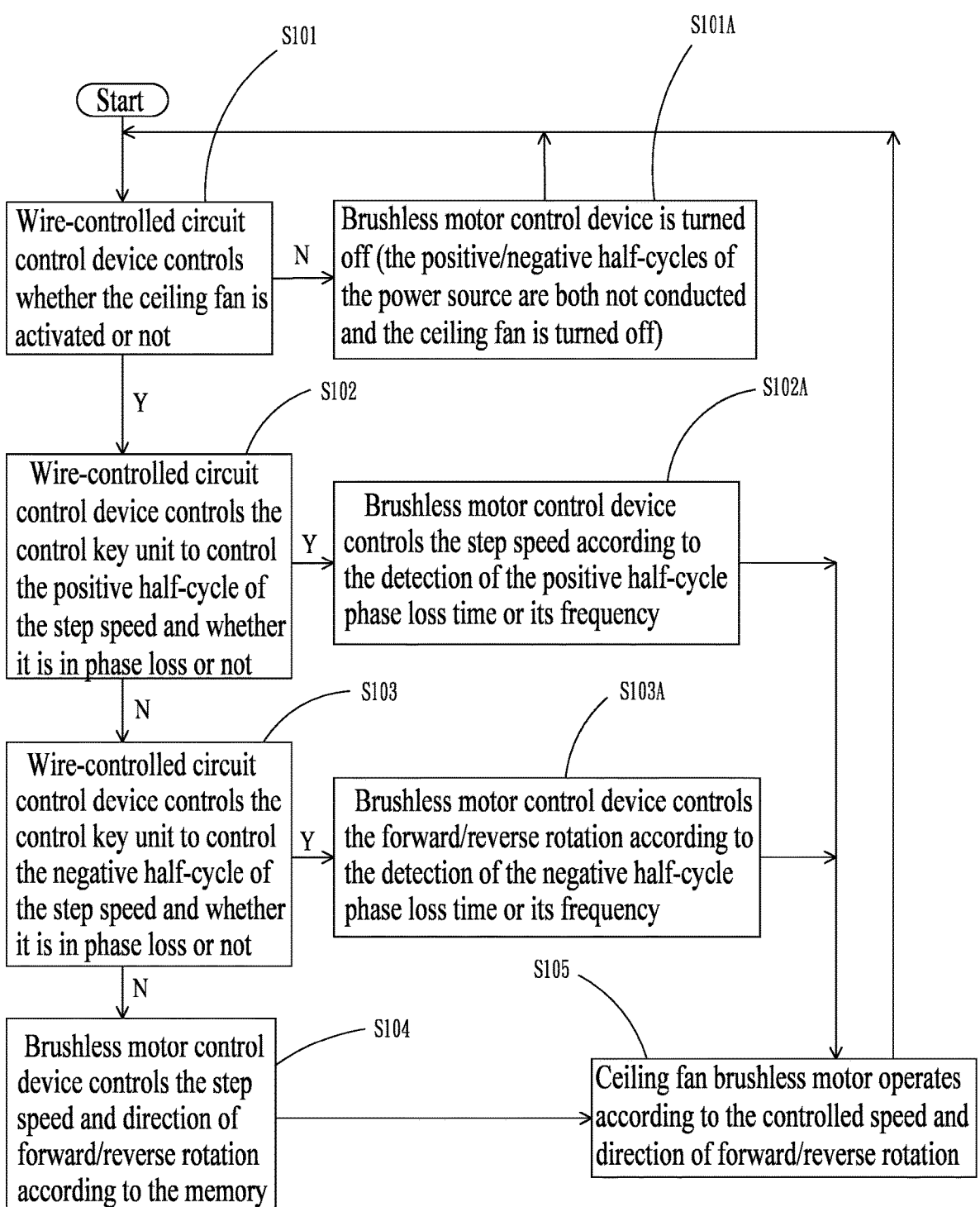
FIG. 3 is a reference diagram of the state of the control flow of the control device for adjusting speed and forward/reverse rotation of a wire-controlled brushless motor power supply during positive/negative half-cycle phase loss of the present invention.
Figure 4:
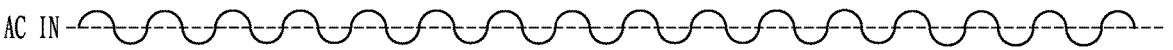
FIG. 4 is a reference diagram of the detection state of the control device for adjusting speed and forward/reverse rotation of a wire-controlled brushless motor power supply during positive/negative half-cycle phase loss of the present invention.
Figure 4:
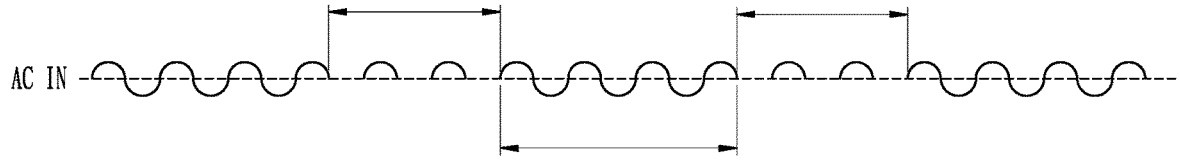
Figure 4:
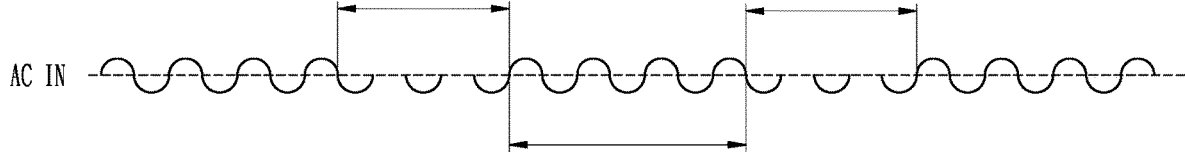
Figure 5:
FIG. 5 is a reference diagram of the detection state of the positive/negative half-cycle and the phase loss cooperated with the time interval of the normal operation detection of the wire-controlled circuit control device and the brushless motor control device of the control device for adjusting speed and forward/reverse rotation of a wire-controlled brushless motor power supply during positive/negative half-cycle phase loss of the present invention.
Figure 5:
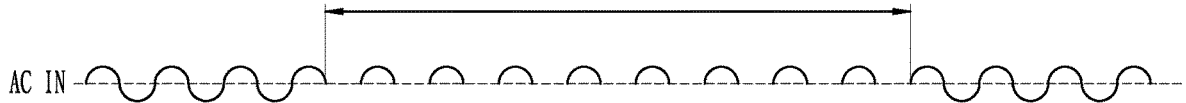
Figure 5:
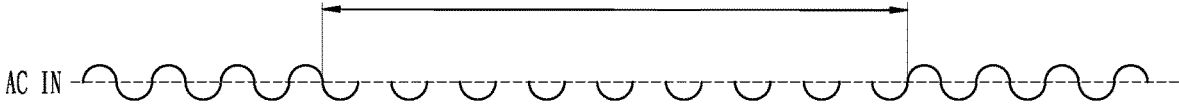

Please refer to FIGS. 1 and 2, which are the reference diagrams of the state of the overall composition and the detailed composition of a control device for adjusting speed and forward/reverse rotation of a wire-controlled brushless motor power supply during positive/negative half-cycle phase loss of the present invention, which is applied to an AC power supply 100 and a ceiling fan brushless motor 30, and which comprises:

a wire-controlled circuit control device 10, which is provided with a wire-controlled microcontroller unit 11, a positive/negative half-cycle control unit 12, a wire-controlled power unit 13, and at least one control key unit 14, wherein the wire-controlled microcontroller unit 11 is electrically connected to the positive/negative half-cycle control unit 12, the wire-controlled power unit 13, and the control key unit 14, respectively, and wherein the AC power supply 100 is electrically connected to the positive/negative half-cycle control unit 12 of the wire-controlled circuit control device 10; and a brushless motor control device 20, which is provided with a brushless motor microcontroller unit 21, a positive half-cycle detector 22, a negative half-cycle detector 23, a brushless motor power unit 24, and a brushless motor control unit 25, wherein the brushless motor microcontroller unit 21 is electrically connected to the positive half-cycle detector 22, the negative half-cycle detector 23, and the brushless motor control unit 25, respectively, and the brushless motor power unit 24 is electrically connected to the positive half-cycle detector 22, the negative half-cycle detector 23, and the brushless motor microcontroller unit 21, respectively; wherein the positive half-cycle detector 22, the negative half-cycle detector 23, the positive/negative half-cycle control unit 12 of the wire-controlled circuit control device 10 are electrically connected, the brushless motor power unit 24, the brushless motor microcontroller unit 21, and the brushless motor control unit 25 are electrically connected, and the brushless motor control unit 25 and the ceiling fan brushless motor 30 are electrically connected;

by using the wire-controlled circuit control device 10 to perform input of the AC power supply positive/negative half-cycle control conditions, and the brushless motor control device 20 to perform a signal's detection and an interpretation to convert the signal into the step speed and forward/reverse rotation control signals for storage and transmit the control signals to the ceiling fan brushless motor 30 to carry out the control.

With the cooperation of the above structures, accomplish the present invention of the control device for adjusting speed and forward/reverse rotation of a wire-controlled brushless motor power supply during positive/negative half-cycle phase loss.

Please refer to FIGS. 1 to 5, which are the reference diagrams of the state of the overall composition, the detailed composition, the control flow, the detection of positive/negative half-cycle and phase loss cooperated with the counting of the normal operation of the wire-controlled circuit control device and the brushless motor control device, and the detection of positive/negative half-cycle and phase loss cooperated with the time interval of the normal operation of the wire-controlled circuit control device and the brushless motor control device of the present invention, comprising an AC power supply 100, a wire-controlled circuit control device 10, a brushless motor control device 20, and a ceiling fan brushless motor 30, wherein the AC power supply 100 is electrically connected to the wire-controlled circuit control device 10, and the AC power supply 100 inputs the current/voltage in the power source to the wire-controlled circuit control device 10 to control the control signals generated from the positive/negative half-cycle on/off of the AC power supply; the wire-controlled circuit control device 10 is electrically connected to the brushless motor control device 20, the positive/negative half-cycle phase loss signals derived from the wire control circuit control device 10 is detected by the brushless motor control device 20 and interpreted in accordance with the length of the positive half-cycle loss time only or the sequence or the frequency of the negative half-cycle loss time only, to generate the control information of the multi-step speed or forward/reverse rotation setting for the memory storage; the brushless motor control device 20 is electrically connected to the ceiling fan brushless motor 30, and the brushless motor control device 20 generates the control signals and transmits it to the ceiling fan brushless motor 30 to perform the multi-step speed and forward/reverse rotation control. The flow of the control method is that when it starts to operate, it enters into the step S101: the wire-controlled circuit control device controls whether the ceiling fan is activated or not; if it detects that it is not activated, then it enters into the step S101A: the brushless motor control device is turned off (the positive/negative half-cycles of the power source are both not conducted and the ceiling fan is turned off); if it detects that it is activated, then it enters into the step S102: the wire-controlled circuit control device controls the control key unit to control the positive half-cycle of the step speed and whether it is in phase loss or not; if it detects that the positive half-cycle is in phase loss, then it enters into the step S102A: the brushless motor control device controls the step speed according to the detection of the positive half-cycle phase loss time or its frequency; and enters into the step S105: the ceiling fan brushless motor operates according to the controlled speed and the direction of forward/reverse rotation; if the positive half-cycle phase loss is not detected, then enters into the step S103: the wire-controlled circuit control device controls the control key unit to control the negative half-cycle of the step speed and whether it is in phase loss or not; if the negative half-cycle phase loss is detected, then enters into the step S103A: the brushless motor control device controls the forward/reverse rotation according to the detection of the negative half-cycle phase loss time or its frequency; and enters into the step S105: the ceiling fan brushless motor operates according to the controlled speed and the direction of forward/reverse rotation; if the negative half-cycle phase loss is not detected, then enter into the step S104: the brushless motor control device controls the step speed and direction of forward/reverse rotation according to the memory; and enter into the step S105: the ceiling fan brushless motor operates according to the controlled speed and direction of forward/reverse rotation. The overall arrangement is simplified and convenient, without the need for complicated and cumbersome wiring, to achieve favorable structural stability and convenience in use.

Please refer to FIGS. 2 to 5, which are the reference diagrams of the state of the detailed composition, the control flow, the detection of positive/negative half-cycle and phase loss cooperated with the counting of the normal operation of the wire-controlled circuit control device and the brushless motor control device, and the detection of positive/negative half-cycle and phase loss cooperated with the time interval of the normal operation of the wire-controlled circuit control device and the brushless motor control device of the present invention. In a preferred embodiment, the wire-controlled microcontroller unit 11 of the wire-controlled circuit control device 10 is an MCU (Microcontroller Unit), and the wire-controlled microcontroller unit 11 is a microcomputer integrated with a central processor, a memory, etc., which enables the storage of the positive/negative half-cycle signals for controlling the on/off after the current/voltage in the AC power supply 100 inputs to the wire-controlled circuit control device 10, thereby effectively simplifying the wiring complexity and increasing the multi-application of the present invention.

Figure 6:
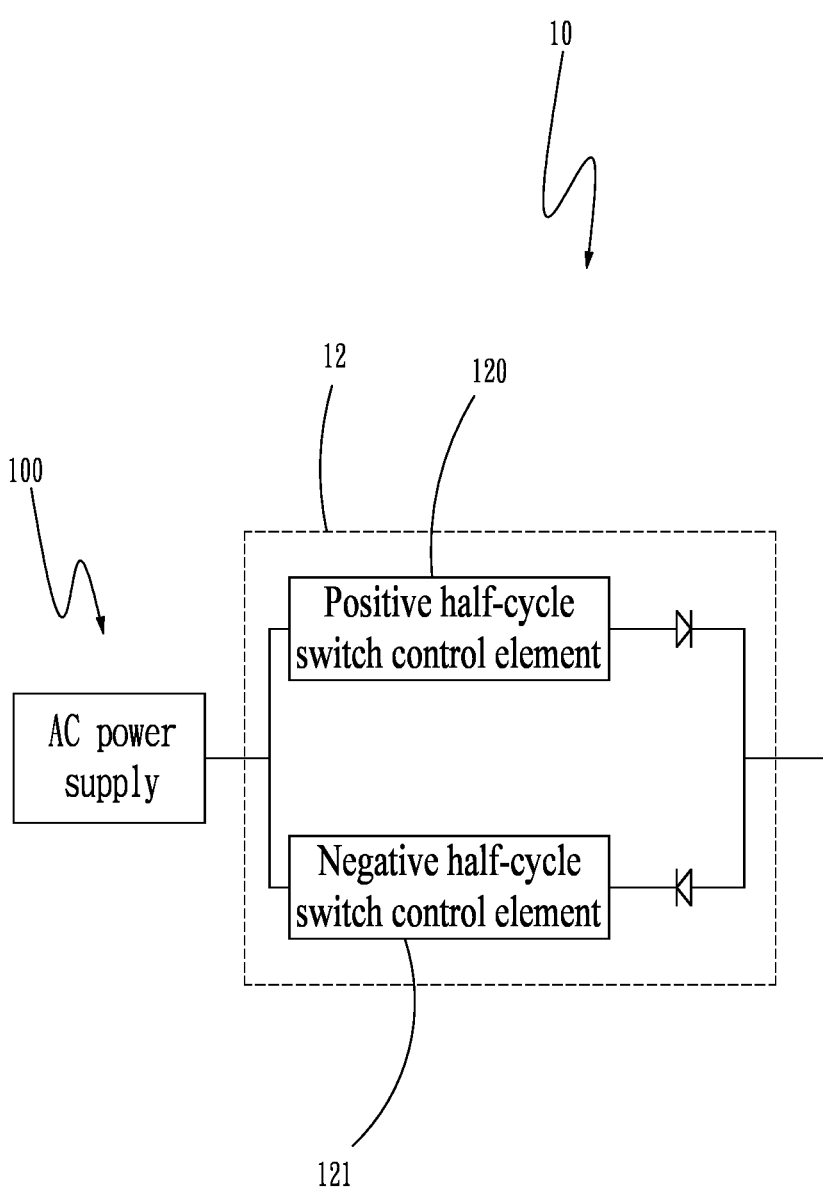
FIG. 6 is a reference diagram of the state for the first embodiment of a positive/negative half-cycle control unit having a positive half-cycle switching control element and a negative half-cycle switching control element cooperated with a relay and a diode provided in the wire-controlled circuit control device of the control device for adjusting speed and forward/reverse rotation of a wire-controlled brushless motor power supply during positive/negative half-cycle phase loss of the present invention.

Please refer to FIGS. 2 and 6, which are the reference diagrams of the state of the detailed composition and the first embodiment of the positive/negative half-cycle control unit having a positive half-cycle switching control element and a negative half-cycle switching control element cooperated with a relay and a diode provided in the wire-controlled circuit control device of the present invention. In a preferred embodiment, the positive/negative half-cycle control unit 12 of the wire-controlled circuit control device 10 is provided with a positive half-cycle switch control element 120 and a negative half-cycle switch control element 121, wherein the positive half-cycle switch control element 120 and the negative half-cycle switch control element 121 are cooperated with a relay and a diode and electrically connected to the AC power supply 100, which enables the control of the on/off input signal from the current/voltage, without the need for control by complicated wiring, thereby increasing the multi-applicability of the present invention.

Figure 7:
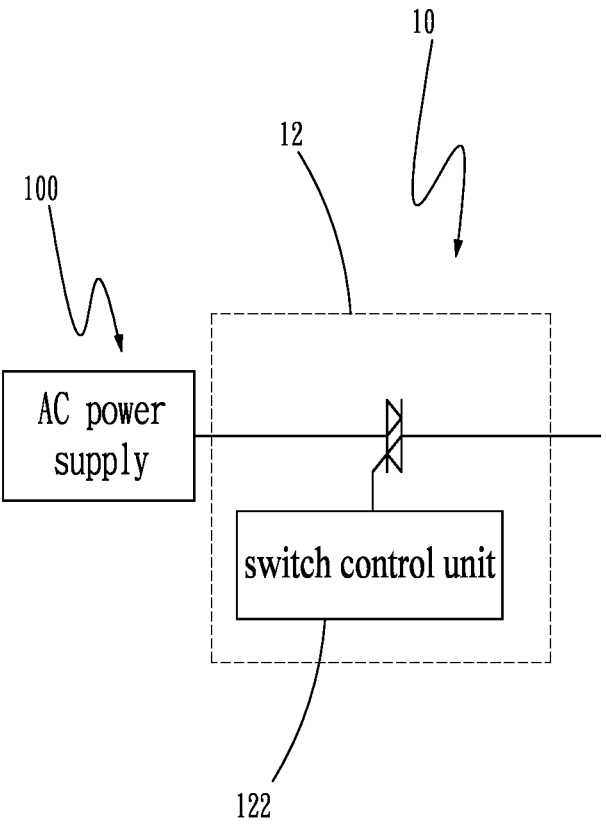
Figure 8:
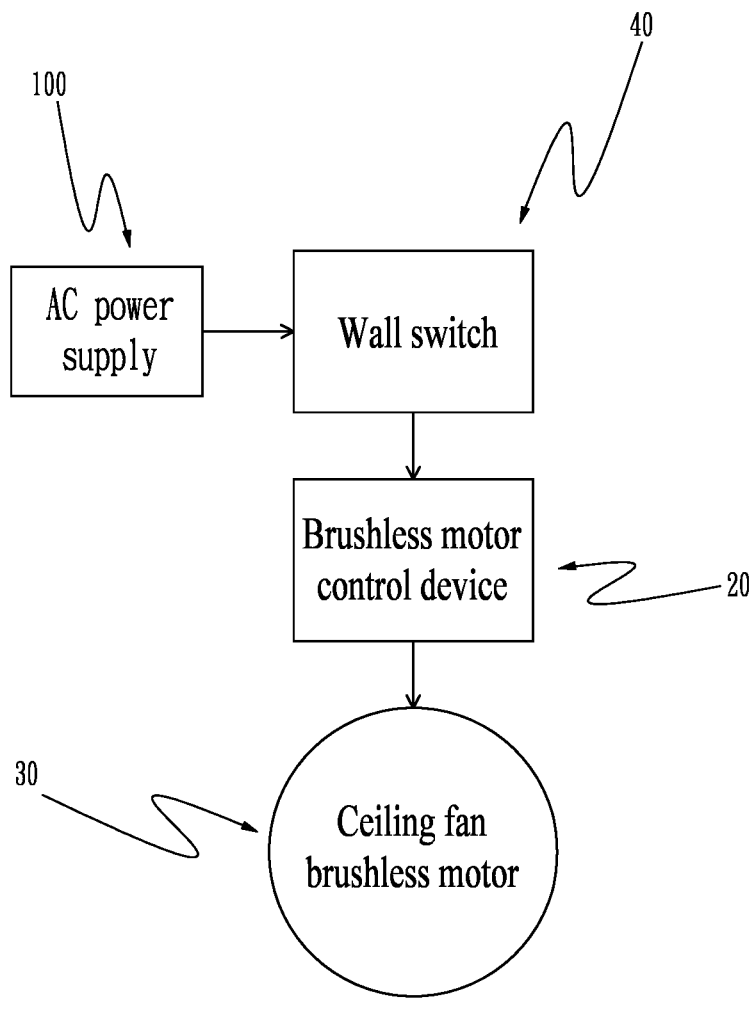
FIG. 8 is a reference diagram of a wire-controlled ceiling fan structure of the prior art.

Please refer to FIGS. 2 and 7, which are the reference diagrams of the state of the detailed composition and the second embodiment of a switching control unit of the positive/negative half-cycle control unit having a bidirectional thyristor (TRIAC) provided in a circuit setting device of the wire-controlled circuit control device of the present invention. In a preferred embodiment, the positive/negative half-cycle control unit 12 of the wire-controlled circuit control device 10 is provided with a switch control unit 122, which is a bidirectional thyristor (TRIAC) and is electrically connected to the AC power supply 100, which enables the control of the on/off input signal from the current/voltage, without the need for control by complicated wiring, thereby increasing the multi-applicability of the present invention.

Please refer to FIGS. 2 to 5, which are the reference diagrams of the state of the detailed composition, the control flow, the detection of positive/negative half-cycle and phase loss cooperated with the counting of the normal operation of the wire-controlled circuit control device and the brushless motor control device, and the detection of positive/negative half-cycle and phase loss cooperated with the time interval of the normal operation of the wire-controlled circuit control device and the brushless motor control device of the present invention. In a preferred embodiment, the brushless motor microcontroller unit 21 of the brushless motor control device 20 is a microcontroller unit (MCU), and the brushless motor microcontroller unit 21 is a microcomputer integrated with a central processor, a memory, a timer/counter, etc., which receives positive/negative half-cycle phase loss signals from the wire-controlled circuit control device 10 and cooperates with the timing or interval signals generated by the timer/counter to perform an interpretation and to form the multi-step speed control signals or forward/reverse rotation control signals for storage, which are used to control the switching of the step speed and the forward/reverse rotation of the ceiling fan brushless motor 30 by the control signals, thereby effectively simplifying the complexity of the wiring and increasing the multi-applicability of the present invention.

Based on the foregoing, the present invention can indeed achieve the above functions and purposes, therefore the present invention meets the requirements for a patent application, and the application is hereby filed by the law.

What is claimed is:

1. A control device for adjusting speed and forward/reverse rotation of a wire-controlled brushless motor power supply during a positive/negative half-cycle phase loss of an AC power supply, which is applied to the AC power supply and a ceiling fan brushless motor, comprising:

a wire-controlled circuit control, which is provided with a wire-controlled microcontroller unit, wherein the wired-control microcontroller unit is programmed with stored parameters corresponding to speed levels and forward/reverse rotation logic control conditions, a wire-controlled power unit, and at least one control key unit, wherein the wire-controlled microcontroller unit is electrically connected to the positive/negative half-cycle control unit, the wire-controlled power unit, and the control key unit, respectively, and wherein the AC power supply is electrically connected to the wire-control power unit of the wire-controlled circuit control; and a brushless motor control device configured to determine whether to enable power to the brushless motor of a ceiling fan, which is provided with a brushless motor microcontroller unit, a brushless motor power unit, and a brushless motor control unit, wherein the brushless motor microcontroller unit is electrically connected to the brushless motor power unit, and the brushless motor control unit, respectively, and the brushless motor power unit is electrically connected to the brushless motor power unit, and the brushless motor microcontroller unit, respectively, and wherein the brushless motor power unit, are electrically connected to the wire-controlled circuit control, and the brushless motor control unit and the ceiling fan brushless motor are electrically connected;

by using the wire-controlled circuit control to perform input of the AC power supply positive/negative half-cycle on/off control, and the brushless motor control device to perform a signal detection and an interpretation to convert the signal into a step speed and forward/reverse rotation control signals for storage and transmit the step speed and forward/reverse rotation control signals to the ceiling fan brushless motor to carry out the control, wherein the wire-controlled circuit control controls whether the ceiling fan is activated or not, wherein in the wire-controlled circuit control, control logic conditions are stored, comprising positive or negative half-cycle phase loss waveforms, phase loss duration, or phase loss frequency, corresponding to step speed and forward/reverse rotation control, wherein, upon operating the control key unit to select control commands for step speed and forward/reverse rotation, the wire-controlled circuit control, via the wire-controlled microcontroller, correlates the input AC power with the stored control logic conditions for step speed and forward/reverse rotation, and selects the control logic conditions for step speed and forward/reverse rotation, corresponding to control signals of positive or negative half-cycle phase loss waveforms, phase loss duration, or phase loss frequency, wherein the control signals are transmitted to the brushless motor drive unit to control the step speed and forward/reverse rotation of the ceiling fan brushless motor.

2. The control device for adjusting speed and forward/reverse rotation of a wire-controlled brushless motor power supply during positive/negative half-cycle phase loss according to claim 1, wherein, the wire-controlled microcontroller unit of the wire-controlled circuit control is an MCU (Microcontroller Unit), and the wire-controlled microcontroller unit is a microcomputer integrated with a central processor, and a memory, which enables storage of the positive/negative half-cycle signals for controlling an on/off after the current/voltage in the AC power supply inputs to the wire-controlled circuit control.

3. The control device for adjusting speed and forward/reverse rotation of a wire-controlled brushless motor power supply during positive/negative half-cycle phase loss according to claim 1, wherein, the wire-controlled circuit control is provided with a positive half-cycle switch control element and a negative half-cycle switch control element, wherein the positive half-cycle switch control element and the negative half-cycle switch control element are cooperated with a relay and a diode, which enables the control of on/off input signals from a current/voltage of the AC power supply.

4. The control device for adjusting speed and forward/reverse rotation of a wire-controlled brushless motor power supply during positive/negative half-cycle phase loss according to claim 1, wherein, the wire-controlled circuit control is provided with a switch control unit, which is a bidirectional thyristor (TRIAC), and which enables the control of on/off input signal from a current/voltage of the AC power supply.

5. The control device for adjusting speed and forward/reverse rotation of a wire-controlled brushless motor power supply during positive/negative half-cycle phase loss according to claim 1, wherein, the brushless motor microcontroller unit of the brushless motor control device is a microcontroller unit (MCU), and the brushless motor microcontroller unit is a microcomputer integrated with a central processor, a memory, and a timer/counter, which receives positive/negative half-cycle phase loss signals from the wire-controlled circuit control and is cooperated with a timing or interval signals generated by a timer/counter to perform an interpretation and to form a multi-step speed control signals or forward/reverse rotation control signals for storage, which are used to control a switching of the step speed and the forward/reverse rotation of the ceiling fan brushless motor by the control signals.

6. The control device for adjusting speed and forward/reverse rotation of a wire-controlled brushless motor power supply during positive/negative half-cycle phase loss according to claim 1, wherein the AC power supply inputs a current/voltage in the power source to the wire-controlled circuit control to control the positive/negative half-cycle on/off of the AC power supply; and a positive/negative half-cycle phase loss signals derived from the wire control circuit control is detected by the brushless motor control device and interpreted in accordance with a length of the positive half-cycle loss time only or a frequency of the positive half-cycle loss time only, and a length of the negative half-cycle loss time only or a frequency of the negative half-cycle loss time only, to generate control information of the multi-step speed or forward/reverse rotation setting for memory storage; and the brushless motor control device generates the control signals and transmits the control signals to the ceiling fan brushless motor to perform the multi-step speed and forward/reverse rotation control.

* * * * *